US012755902B2

(12) United States Patent
Bartlett

(10) Patent No.: US 12,755,902 B2
(45) Date of Patent: Oct. 6, 2026

(54) VIDEO SURVEILLANCE PLAYBACK SYSTEM WITH MULTI-TIERED STORAGE

(71) Applicant: Jay Jason Bartlett, San Diego, CA (US)

(72) Inventor: Jay Jason Bartlett, San Diego, CA (US)

(73) Assignee: Cozaint Corporation, Palmetto Bay, FL (US)

( * ) Notice: Subject to any disclaimer, the term of this patent is extended or adjusted under 35 U.S.C. 154(b) by 331 days.

(21) Appl. No.: 18/065,506

(22) Filed: Dec. 13, 2022

(65) Prior Publication Data

US 2024/0195933 A1 Jun. 13, 2024

(51) Int. Cl.
*H01G 4/224* (2006.01)
*G06F 3/06* (2006.01)
*G11B 15/68* (2006.01)
*H01G 4/236* (2006.01)
*H01G 4/38* (2006.01)
(Continued)

(52) U.S. Cl.
CPC .......... *H01G 4/224* (2013.01); *G06F 3/0608* (2013.01); *G06F 3/0647* (2013.01); *G06F 3/0685* (2013.01); *G11B 15/6895* (2013.01); *H01G 4/236* (2013.01); *H01G 4/38* (2013.01); *H04N 5/7605* (2013.01); *H04N 5/765* (2013.01); *H04N 5/782* (2013.01); *H04N 5/907* (2013.01); *H04N 7/181* (2013.01)

(58) Field of Classification Search
CPC .......... H01G 4/224; H01G 4/236; H01G 4/38; H01G 2/10; H01G 4/228; H01G 4/232; H01G 4/30; G06F 3/0608; G06F 3/0647; G06F 3/0685; G11B 15/6895; H04N 5/7605; H04N 5/765; H04N 5/782; H04N 5/907; H04N 7/181; H01R 13/5202; H01R 13/40; H01R 13/502; H01R 13/5213
USPC .......... 386/226
See application file for complete search history.

(56) References Cited

U.S. PATENT DOCUMENTS 10,715,837 B2 * 7/2020 Gardner .......... H04N 21/231
11,662,954 B1 * 5/2023 Itagaki .......... G06F 3/0647
711/112
(Continued)

FOREIGN PATENT DOCUMENTS

WO WO-2022185562 A1 * 9/2022 .......... A63F 13/497

*Primary Examiner* — Loi H Tran

(57) ABSTRACT

This invention relates to video surveillance data management solutions. More specifically this invention relates to the integration of multiple tiers of dissimilar computer storage technologies to deliver longer video retention and easy video playback. The system captures video data from multiple surveillance cameras and stores it on rapidly accessible storage and replicates to second tier of slower accessible storage such as data tape storage. Video retention policies are determined from parameters of number of cameras, frame rates, resolution, and number of days of video retention desired. Storage procedures are set for multiple tiers of video storage that allow for the highest quality video be recorded without compression by utilizing a <u>new container file</u> architecture that enforces physical sequentiality on the storage media. A human video operator can select any recorded surveillance video data under management to be retrieved for display and playback in a timely manner without any additional steps or human interaction.

13 Claims, 6 Drawing Sheets

*One Embodiment of the present invention: Overarching video capture and playback process*

(51) Int. Cl.

| | |
|---|---|
| ***H04N 5/76*** | (2006.01) |
| ***H04N 5/765*** | (2006.01) |
| ***H04N 5/782*** | (2006.01) |
| ***H04N 5/907*** | (2006.01) |
| ***H04N 7/18*** | (2006.01) |

(56) References Cited

U.S. PATENT DOCUMENTS

| | | | | |
|---|---|---|---|---|
| 2006/0085547 | A1* | 4/2006 | Cormier | H04L 67/02<br>709/227 |
| 2007/0047280 | A1* | 3/2007 | Haustein | G11B 27/002 |
| 2019/0324899 | A1* | 10/2019 | Kulkarni | G06F 3/0653 |
| 2022/0001279 | A1* | 1/2022 | Colenbrander | G06F 3/0656 |
| 2022/0261152 | A1* | 8/2022 | Jude | G06F 3/0647 |

* cited by examiner

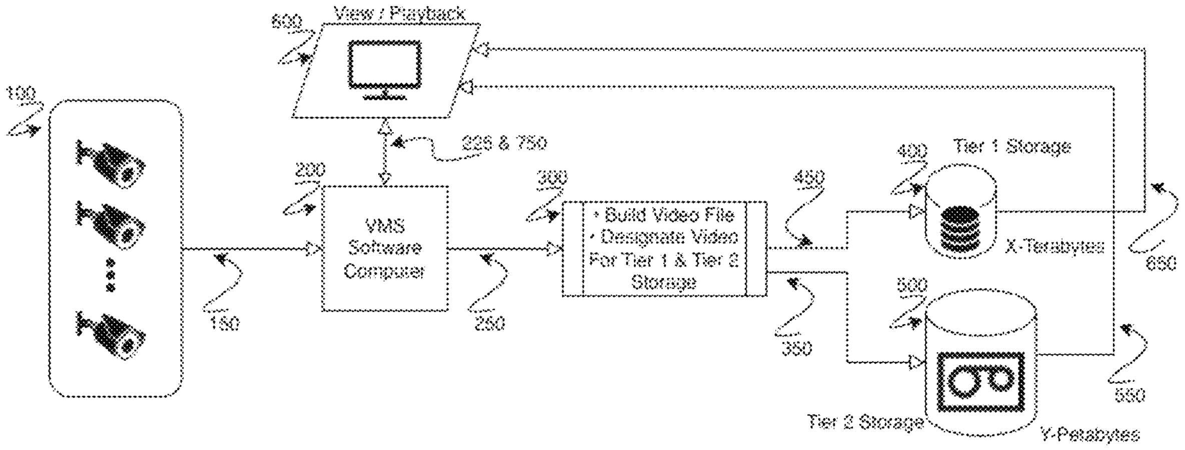
*Fig. 1: One Embodiment of the present invention: Overarching video capture and playback process*

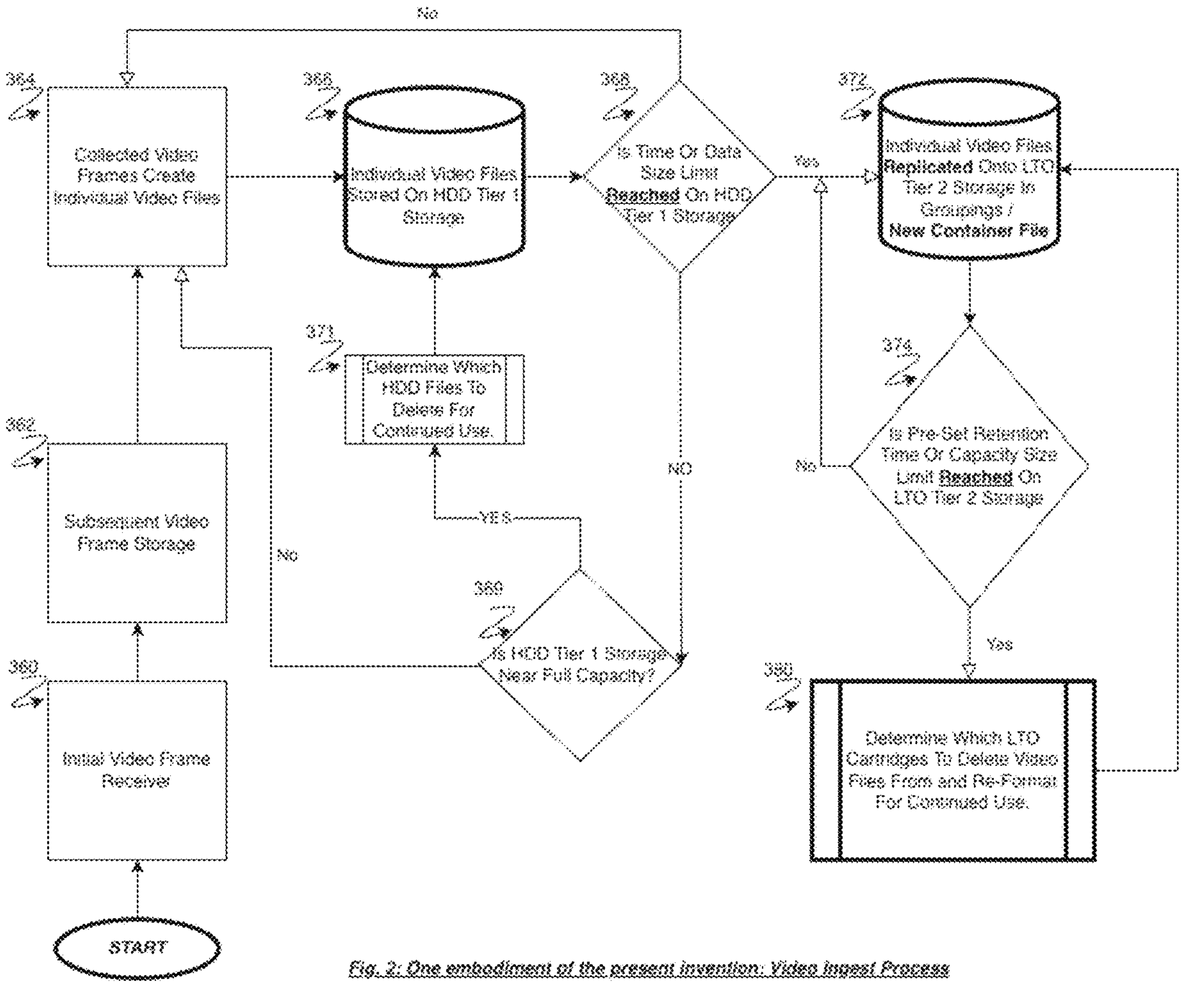
*Fig. 2: One embodiment of the present invention: Video Ingest Process*

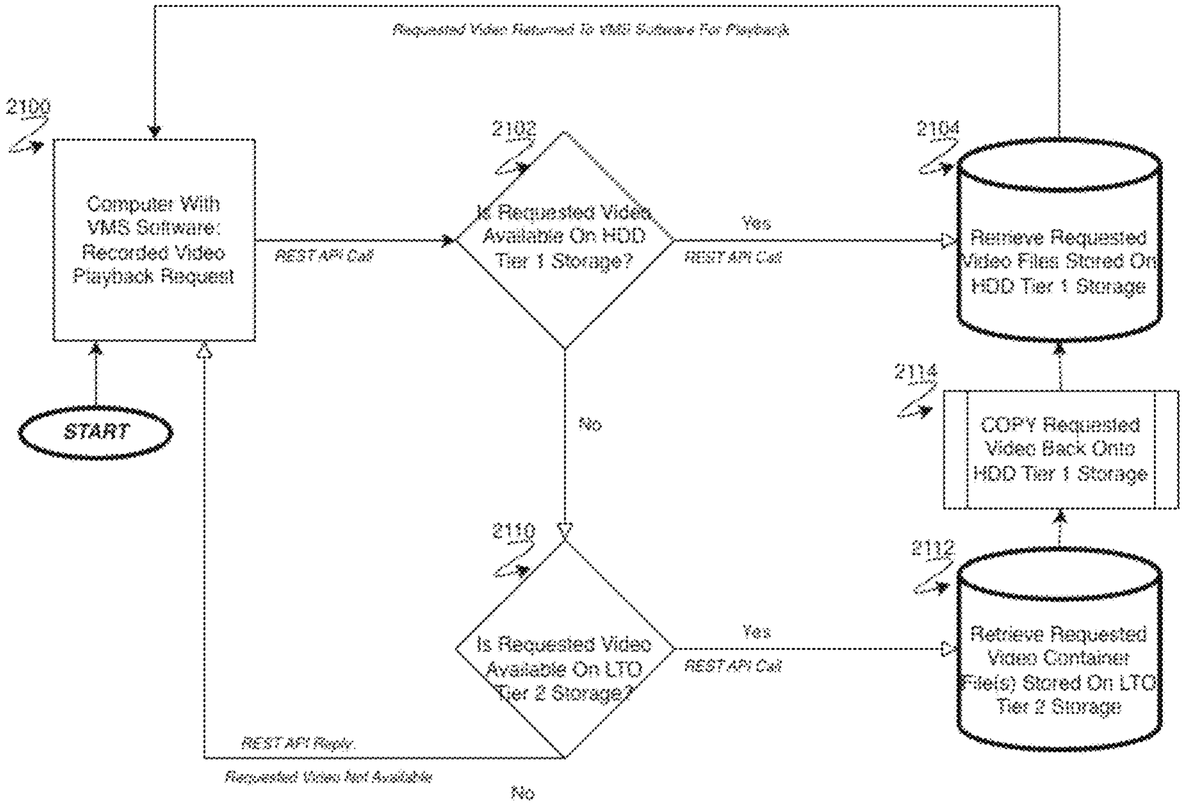
*Fig. 3: One Embodiment of the present invention: Video Playback Process*

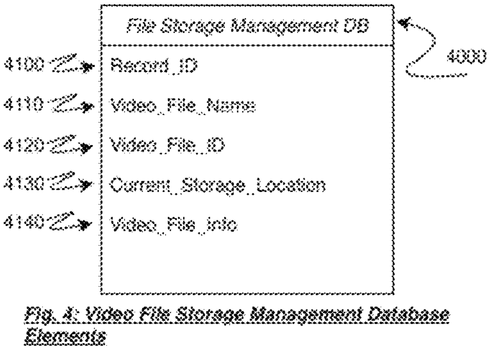
Fig. 4: Video File Storage Management Database Elements
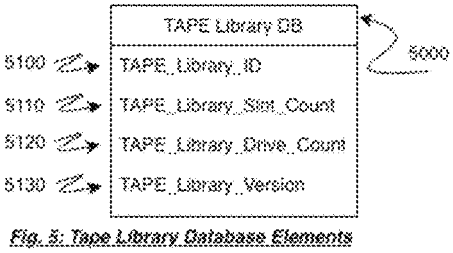
Fig. 5: Tape Library Database Elements
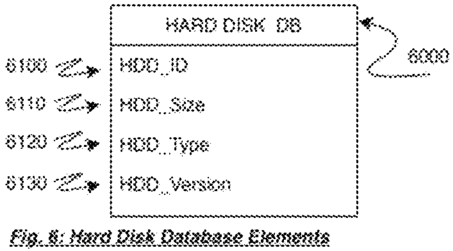
Fig. 6: Hard Disk Database Elements
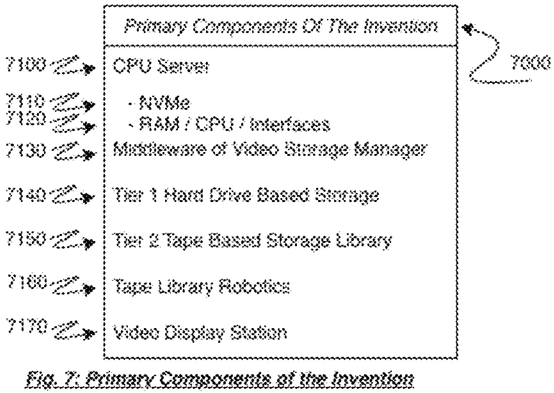
Fig. 7: Primary Components of the Invention
Fig. 8: Example of a Video Management Software (VMS) Timeline Interface

Fig. 9: Example of a Video Management Software (VMS) Timeline Displaying Stand by Dialog While Video is Being Retrieved for Playback.

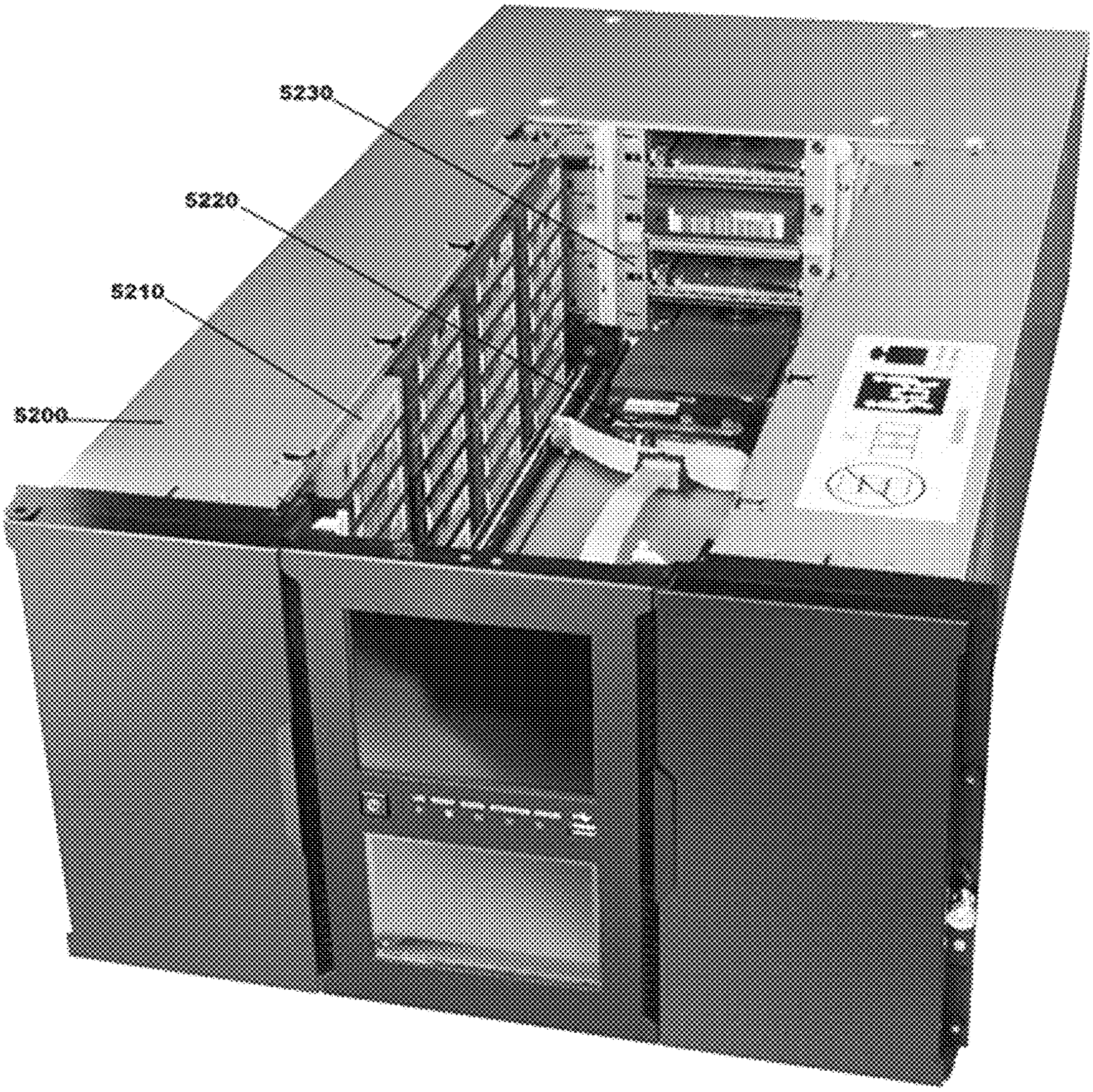
Fig. 10: Example of a Data Tape Library (Jukebox) Device with Slots and Drives
5200 Digital Computer Data Tape Library Computer Hardware Device
5210 One of a plethora of Tape cartridges
5210 A Tape cartridge inserted into a Tape Library slot
5220 A robotic Tape cartridge picker mechanism
5230 A Tape Drive for reading and writing video data to Tapes

VIDEO SURVEILLANCE PLAYBACK SYSTEM WITH MULTI-TIERED STORAGE

An overarching method, system, and techniques for managing a complete video surveillance management system with multi-tier video data storage comprising of video data captured from one or more surveillance cameras and utilizing multiple tiers of rapidly accessible and slower accessible video surveillance data storage devices to deliver significantly greater video surveillance retention through a combination of data storage technologies, which provides a viable, seamless, video surveillance playback system without any additional human interaction or reduction in the quantity or quality of the captured video.

CROSS-REFERENCE TO RELATED APPLICATIONS

None

STATEMENT REGARDING FEDERALLY SPONSORED RESEARCH OR DEVELOPMENT (IF APPLICABLE)

No federally sponsored research and development was provided for this invention.

REFERENCE TO SEQUENCE LISTING, A TABLE, OR A COMPUTER PROGRAM LISTING COMPACT DISC APPENDIX (IF APPLICABLE)

Not Applicable

FIELD OF CLASSIFICATION SEARCH

CPC Class: G06F 3/0601, 3/0608, 3/0617, 3/0619, 3/0628, 3/0629, 3/0631, 3/0632, 3/0633, 3/0634, 3/0635; 16/125, 16/7837; G08B 13/19656; G08B 13/19676; H04N 21/274; 21/4223; 21/4334; 7/181;

This proposed invention relates to the physical security industry specifically the video surveillance market. Moreover, this invention utilizes video surveillance cameras, in a video surveillance network, with video management software (VMS) to execute computer software in such a manner to ingest video, capture video to various data storage devices, and manipulate the recorded video throughout an infrastructure of computer hardware devices to allow a human video operator to recall, display, and playback any available recorded video under management without any separate steps, interaction, or human intervention.

BACKGROUND OF THE INVENTION

Background Art

U.S. Pat. No. 6,041,361A Sensormatic Electronics Corporation
Digital video recorder providing separate pipelining for odd and even fields from a single camera
U.S. Pat. No. 6,144,797A Sensormatic Electronics Corporation
Intelligent video information management system performing multiple functions in parallel
US20030185296A1 Masten James W.
System for the capture of evidentiary multimedia data, live/delayed off-load to secure archival storage and managed streaming distribution US20040119820A1 Murakami Corporation
Transmitter for surveillance camera, and surveillance system
US20040143602A1 Antonio Ruiz
Apparatus, system and method for automated and adaptive digital image/video surveillance for events and configurations using a rich multimedia relational database
US20040155958A1 Mi-Suen Lee
User assisted customization of automated video surveillance systems
US20050102704A1 Rudy Prokupets
Multiregional security system integrated with digital video recording and archiving
US20050271251A1 Russell Stephen G
Method for automatically reducing stored data in a surveillance system
US20060066720A1 Martin Renkis
Wireless video surveillance system and method with external removable recording
US20060078047A1 International Business Machines Corporation
Video analysis, archiving and alerting methods and apparatus for a distributed, modular and extensible video surveillance system
US20060176369A1 Meritt Ronald R
Portable, self-contained video recording and display system and method
US20060184553A1 Matsushita Electric Industrial Co., Ltd.
Distributed MPEG-7 based surveillance servers for digital surveillance applications
US20060192675A1 Renkis Martin A
Enterprise video intelligence and analytics management system and method
US20060274829A1 A4S Security, Inc.
Mobile surveillance system with redundant media
US20060274828A1 A4S Security, Inc.
High capacity surveillance system with fast search capability
US20070217501A1 A4S Security, Inc.
Surveillance system with digital tape cassette
US20090079823A1 Dirk Livingston Bellamy
Methods and systems for operating a video surveillance system.
U.S. Pat. No. 7,382,244B1 Donovan, Hussain
Video surveillance, storage, and alerting system having network management, hierarchical data storage, video tip processing, and vehicle plate analysis
U.S. Pat. No. 7,460,149B1 Donovan, Hussain
Video data storage, search, and retrieval using metadata and attribute data in a video surveillance system
U.S. Pat. No. 7,760,230B2 Russell, Vallone, Freeman, Fleischer, Haupt
Method for automatically reducing stored data in a surveillance system
U.S. Pat. No. 8,013,738B2Donovan, Hussain
Hierarchical storage manager (HSM) for intelligent storage of large volumes of data
U.S. Pat. No. 8,797,404B2 Joseph, Perumal
Managing memory in a surveillance system
U.S. Pat. No. 8,953,038B2 Lu, Sheinin
Distributed video surveillance storage cost reduction using statistical multiplexing principle
U.S. Pat. No. 9,986,209B2 Meyer.
Method and system for managing data from digital network surveillance cameras U.S. Pat. No. 10,341,684B2 Drako, Roskowski
High definition surveillance image storage optimization apparatus and methods of retention triggering

OTHER REFERENCES CITED

Video Surveillance And The Storage Challenge, By LTO BlogBytes, https://www.lto.org/2021/09/video-surveillance-storage-challenges/, September 2021

Video Surveillance Advancements Lead To Data Storage Challenges, SecurityInformed.com magazine, https://www.securityinformed.com/insights/video-surveillance-data-storage-challenges-co-10817-ga-co-2851-ga-co-11453-ga 21002.html, date unknown What are guidelines for cloud-based video surveillance storage? By Brien Posey, https://www.techtarget.com/searchstorage/answer/What-are-guidelines-for-cloud-based-video-surveillance-storage, 5 May 2022

Worldwide Video Surveillance Storage Industry to 2027, ResearchAndMarkets.com, https://www.yahoo.com/entertainment/worldwide-video-surveillance-storage-industry-134800487.html. Dec. 6, 2021

Video Surveillance Storage Market, Persistence Market Research, https://www.persistencemarketresearch.com/market-research/video-surveillance-storage-market.asp, date unknown LTO digital computer data tape: LTO Consortium, https://www.lto org/roadmap/, date unknown T10000 digital computer data tape: Wikipedia Reference: https://en.wikipedia.org/wiki/StorageTek tape formats, date unknown

Technical Field

Summarizing those previously issued patents highlights the numerous prior arts for the management and storage of generic and video data on various computer storage devices. Focusing on the video surveillance field, video data has grown significantly in size with technology advances of video surveillance cameras and the availability of surveillance cameras to the general market. Prior art has created various solutions for the generalized storage of video surveillance data, with many instances focusing on offline storage. Prior art, from other marketplaces-namely the media and entertainment industry—has used various video data storage technologies to handle the amount of video data under management.

Prior art has also implemented solutions to distribute the video storage to numerous storage devices to minimize the impact of such quantities of video data on one storage device. A great many prior art approaches have created ways to alter, manipulate, or edit the video data itself to reduce the file size of the video data in an attempt to store more video in the same amount of storage capacity. Other prior art solutions created ways to offload, archive, or to move video data to an offline data storage device to, again, reduce the amount of video data under active management.

What all of these prior art methods and systems have done is to mitigate the initial video data under manage in ways to make it more manageable utilizing known traditional storage techniques.

What the submitted proposed invention creates is a new system, method, and middleware program for recording, storing, and replicating video surveillance data on multiple tiers of rapidly accessible and slower accessible video surveillance storage in such an automatic way so that the human video operator, using original video surveillance management software (VMS) can recall, display, and playback any available recorded video without any alteration of the video data, without any additional steps by the video operator, or without any other human intervention, and with a proces's that integrates with the original VMS program in such a way that the VMS program does not cease to function because the retrieval from slower (more affordable) data storage system causes the VMS program to time out. It is this recall, retrieval, and non-interventive video playback that is the primary focus of this proposed invention.

Beginning in 2008, when the video surveillance industry saw a major transition from analog surveillance cameras and analog video recorders (VCR tapes) as the primary technology over to newer digital surveillance cameras (IP-cameras) and computer hard-disk drive video storage systems, managing the video storage retention of these surveillance systems has been a daunting challenge and one that many have tried to improve upon ever since.

As per any invention, the background of this proposed invention is critically important to fully appreciate the impact of this offered invention. Many other prior art and patents have been issued attempting to mitigate the video surveillance storage retention challenge from various perspectives, however, none of the previous implementations have been able to provide both extendable, scalable, and affordable video storage retention- and the integration to the original VMS program to avoid program failure- and the ability for the human video operator to playback, review, and analyze the entire cache of stored video data without any additional steps or intervention.

As is known, typically, one or more video cameras are purposefully positioned throughout an environment used to capture images of people, other objects, and activities that come within the range of the cameras. Video surveillance systems can transmit surveillance information via wire-based and wireless technology and across the Internet back to a video management software (VMS) program.

As is known, traditional surveillance systems record and store surveillance footage to various video storage mediums for future playback, reference, and analysis. By design and desire, video surveillance data generated by a surveillance camera is stored in its entirety.

With the technology advances of the surveillance IP-cameras, the digital files generated by those cameras have become very large and demand a great deal of computer storage space. In addition, in order for a surveillance system to fully monitor an area, multiple cameras are generally required. As the number of cameras in a surveillance system increases, the amount of video data that is to be stored also significantly increases.

As is known, to accommodate these storage requirements, many traditional surveillance system architectures make use of video data storage that overwrites older stored video data with newer video data after a certain timeframe. An example would be when a traditional system storage capacity can support two months' worth of continuous surveillance video data. After those two months expire, the traditional system storage capacity is reused, starting by overwriting the oldest video data. Obviously, older surveillance video data, which may still have value, is lost in a system that performs such an overwrite storage design.

As is known, there are traditional systems that alternatively back up or archive all or some parts of the video data wholesale to offline archival storage media once the video data has reached the previously described storage capacity or set retention period. That is, all video data captured by the surveillance system is archived after a set period of time passes. In these systems, once data has been archived or backed-up, it is no longer online or easily available to the human video operator user without several additional steps or other human interaction to retrieve desired recorded video.

As is known, many traditional systems with archival processes will require some type of human intervention and additional steps to be able to recall, playback, and review any older or archived video data then what is currently recorded in primary system storage. The requested video archival media must be identified and reloaded in order to view or obtain information about a particular event caught by surveillance video. Typically, in those traditional systems, any video data that is archived is considered outside of the normal video operator playback and review process. Traditionally, prior art systems caused many system delays or outright failures of the original VMS programs trying to utilize such data storage systems.

Although that method allows video data to be stored for a longer period of time, there is no previously known way to identify, extract, or peruse archived surveillance video data in such a timely manner to be recognized as useful or viable to users. In many cases, those prior art systems are very complex and time-consuming tasks and become unviable to the human operator. Much prior art has made claims to using multiple tiers of data storage for the purpose of recording and storing video, yet no prior art has described or defined how it would identity, recall, and playback such recorded video surveillance data, especially without significant additional steps or other human interaction to create a seamless process to the original VMS program.

As is known, other traditional systems may attempt to pre-determine the importance of certain surveillance video data and migrate or replicate that video data to other tiers or medium of data storage. This concept assigns a pre-determined importance level on the video data to ascertain whether to delete, archive, or otherwise reduce the quality of the video data itself, thereby increasing the previously allocated video data storage capacity of the surveillance system.

As is known, there are numerous other video surveillance systems in place that attempt to manipulate the stored surveillance video data by various methods of reducing the video frame rate, and/or the video resolution quality, and/or the color depth of the video all in attempt to reduce the overall data file size of the video. In other words, in an attempt to keep as much video data stored as possible on the available data storage infrastructure, these traditional systems greatly manipulate the video data.

As is known, manipulating, altering, editing, or changing any video data evidence is not admissible in a court of law and thus undermines a valuable purpose of a video surveillance system in the first place; having evidence of an event that occurred.

As is known, video surveillance systems have used numerous data storage technologies from analog to digital systems. In the analog systems, many used VCR/VHS tape introduced in the market in the mid-1970s. In the digital system, many use digital computer hard drives, CDs, DVDs, and other digital storage technologies.

As is known, the various traditional systems have approached the video surveillance data storage challenge from the perspective of limiting the video data storage capacity to begin with, or by manipulating and reducing the video data file itself. These traditional systems have also attempted to utilize multiple tiers of data storage with the approach to archive or move offline the video data from the primary storage system. This removes the video from the primary video management software playback and review process and creates additional steps and intervention by human operators in order to identify, recall, and playback any available recorded video.

As is known, there is a significant technical difference between analog VHS tape and digital computer data tape such as Linear Tape Open (LTO) or T10000 format tape.

As is known, Linear Tape Open (LTO) tape and T10000 tape is used in various markets, such as the media and entertainment industry, which stores production video to tape systems. However, those other market systems and techniques that utilize the recorded video is significantly different than the video surveillance industry.

Therefore, as recognized by the present inventor, what are needed are methods, techniques, and an overarching system of video surveillance management that can intelligently store large amounts of surveillance video data utilizing multiple tiers of data storage devices in such an infrastructure that keeps the quality and integrity of the video data whole and intact, keeps all recorded video easily assessable to the human video user/operator without any additional steps or human intervention (nor additional software) without any pre-determination of such needed video data, and importantly for the original VMS program to continue operation without stopping due to a time out issue waiting for the retrieval of surveillance video data from slower accessible storage.

The techniques described herein of the proposed invention provide for managing video data storage in a traditional video management software (VMS) program utilizing multiple tiers of rapidly accessible and slower accessible storage devices, specifically, Linear Tape Open (LTO) or T10000 tape.

One problem with most, if not all, current approaches to video surveillance systems- and video data storage management more specifically—is that those solutions require extra steps outside of the video surveillance management software by the human operator or other staff personnel. This becomes a usability issue that becomes unpractical, and ultimately unviable to initiate those extra steps when in the process of needing to playback and review recorded video frequently.

Current systems suffer from significant mechanical latency when retrieving specific video from sequential media. There is a technical need for a system that can aggregate distinct streams into a new container file to optimize sequential writing and minimize mechanical seek commands during playback.

SUMMARY OF THE INVENTION

In general, the proposed invention provides a system coupled with appropriate computer hardware devices for intelligently storing surveillance data in a video surveillance management system utilizing a multi-tiered storage infrastructure of rapidly accessible and slower accessible storage devices. Additionally, methods of extending the amount of calendar time for which video data can be stored on a video surveillance data storage device as well as the ease and consistent-uninterrupted-operation by the human video operator of such a system are provided herein.

One embodiment of the present invention is a system along with its accompanying video surveillance data storage hardware wherein the disclosed system applies decision criteria, such as rules, configuration data, and preferences to support intelligent automatic video data storage onto multiple tiers of video data storage-consisting of rapidly accessible storage and slower accessible storage- and the seamless video playback of all recorded surveillance video data for a human video operator.

One embodiment of the present invention would include, but is not limited to, one or more surveillance cameras for capturing video data, one or more live and recorded video playback stations, one or more tiers of video data storage such as traditional hard disks, and one or more tiers of slower accessible video data storage such as digital computer data tape (e.g., Linear Tape Open or T10000 formats), and the overarching computer program for video management middleware (middleware).

It is expressly stated that the usage of slower accessible digital computer data tape storage technology such as (but not limited to) Linear Tape Open (LTO) or T10000 format Tape tier of video surveillance storage is utilized automatically on the recording/storing process by the proposed middleware system as well as the operator playback and review process within the original VMS program, while preventing the original program from ceasing operations due to data retrieval time out situations. It is this all-encompassing system that is ultimately unique to this present invention and differs in implementation, utilization, and implementation from prior art.

The middleware that controls and manages the overall system holds one embodiment of the present invention wherein the middleware software will determine the availability of the first tier of rapidly accessible video data storage capacity and record and store all new incoming video data.

The middleware software will also determine when it is necessary to replicate any new stored video from tier one hard disk of rapidly accessible storage to tier two of slower accessible (i.e., tape) storage. The middleware software will also determine when the second tier storage is near capacity and begin to overwrite the oldest stored video.

The middleware software will also determine, when a human video operator is requesting recorded video to be played back, which tier of storage the video is currently located and retrieve that video data to display to the video operator automatically and without any additional intervention or the original VMS program from ceasing operation due to time out issues.

Understanding that the focus of the human video operator is on the original program Timeline functionality and that the execution of the work necessary by the human video operator to retrieve and playback recorded video surveillance data centers around the use of the VMS software's Timeline feature. Any extra steps other than selecting video from the Timeline or other staff personnel to intercede for the purpose of finding and eventually making recorded video data available for playback becomes untenable, unproductive, and unusable.

It must be understood that since 2008 and the conversion to more digital oriented video surveillance management systems, the market has been accustomed to altering the recorded video either in video quality, video frame rate, or video color or all of the above in order to obtain a level of video retention. It is expressly stated that the present invention does not alter the video in any manner whatsoever.

Reiterating, the present invention does not—in any manner—alter, edit, adjust, or modify the actual video data being recorded. Instead, it specifically uses a multi-tiered video storage infrastructure in a new and unique way that allows for the seamless and straightforward selection of needed video by the human video operator without any other steps or staff needed to retrieve, display, and playback that requested video.

This present invention also does not—in any manner—manage the multiple tiers of video storage in an offline manner. To the contrary, the present invention is specifically delivering all of the recorded video in an online and nearline manner. This is what allows for the human video operator to seamlessly access all of the recorded video under management.

With all of these previous attempts at dealing with the explosive growth of video data, it has not been obvious—otherwise it would have been done over the previous 14 years—to create a system to integrate the original program with the disclosed middleware techniques to manage multiple tiers of computer video surveillance data storage, especially and specifically computer slower accessible digital data tape, in such a manner for a human video operator to simply utilize the original program Timeline feature to identify and playback any and all video under management without any additional steps or other human intervention.

BRIEF DESCRIPTION OF THE DRAWINGS

FIG. 1 is a block diagram of the overarching video capture and playback process in accordance with one embodiment of the present invention;

FIG. 2 is a block diagram of an example of the video ingest process in accordance with one embodiment of the present invention;

FIG. 3 is a block diagram of an example of the video playback process in accordance with one embodiment of the present invention;

FIG. 4 is a table of a Video File Storage Management Database in accordance with one embodiment of the present invention;

FIG. 5 is a table of a Tape Library Storage Database in accordance with one embodiment of the present invention;

FIG. 6 is a table of the Hard Disk Storage Database in accordance with one embodiment of the present invention;

FIG. 7 is a Table of the primary high-level components in accordance with one embodiment of the present invention;

FIG. 8 is a reference to the video management software (VMS) video playback timeline in accordance with one embodiment of the present invention;

FIG. 9 is a reference software screen of the video management software (VMS) video playback user interface (GUI) depicting the dialog message to the video operator to stand by for video retrieval and playback in accordance with one embodiment of the present invention;

FIG. 10 is an exploded view of a robotic digital computer data tape library (aka Jukebox) designed to house a plethora of data tapes for video storage in accordance with one embodiment of the present invention.

What is claimed is:

1. A system for an overarching multi-tiered video surveillance data storage system providing sequential writing optimization for LTO media for managing time-based video surveillance data streams from a network of video surveillance cameras, providing video playback, with the system comprising:

- a server computer system configured to execute a Video Management Software (VMS) application;
- a high-speed storage tier comprising at least one NVMe flash storage module;
- a first archival storage tier comprising at least one hard disk drive (HDD);

a second archival storage tier comprising at least one Linear Tape Open (LTO) tape library system;

a metadata database accessible by the system, and a video data management middleware layer configured to execute on the server computer system and operate between the VMS application and the storage tiers, the middleware being specifically configured to minimize mechanical seek commands and overall video data retrieval time of the LTO tape library system by:

aggregating distinct video surveillance data streams from a plurality of distinct surveillance cameras stored on the first storage tier into a new container file based on shared time intervals;

physically writing the new container file in the second archival storage tier on LTO media in a contiguous sequential format, such that the video data for all cameras in the plurality for the shared time interval is stored within a single physical span on the LTO media;

performing deterministic mapping of time-indexed video segments to corresponding physical tape block addresses, such that each defined time interval of recorded video is associated with a fixed, reproducible starting and ending location on the LTO media, and upon receiving a playback request from the VMS application for a first camera within the shared time interval:

configured to retrieve the new container file by issuing a direct LTO media command to move the LTO tape to the starting physical block address, and configured to automatically replicate the entire new container file, including the first camera and all other distinct cameras in the plurality, onto the high-speed storage tier configured to enable immediate playback of any camera recorded video from the plurality for that shared time interval without further mechanical seek commands of the LTO tape library system;

wherein the video data management middleware layer is further configured to maintain a mapping between video timestamps and physical block addresses across supported storage tiers, such that in response to a playback request, the middleware layer identifies whether the requested video data resides on the high-speed storage tier or an archival storage tier, and if the requested video data resides on an archival storage tier, retrieves the corresponding new container file by issuing a direct LTO tape positioning command to the starting physical block address and replicates the new container file to the high-speed storage tier prior to delivering the video stream to the VMS application.

2. The system of claim 1, wherein the video data management middleware layer is configured to store incoming video surveillance data in the high-speed storage tier having a lower storage capacity, and to aggregate and replicate the stored video surveillance data as the new container file to the second archival storage tier having a greater storage capacity.

3. The system of claim 1, wherein the video data management middleware layer is configured to control operation of the Linear Tape Open (LTO) tape library system, including one or more tape drives and an automated tape handling mechanism, by issuing commands to position a selected tape cartridge and retrieve the new container file from a physical location on LTO media corresponding to the mapped physical block address.

4. The system of claim 1, wherein the system aggregates the capacities of the slower accessible storage tiers to provide data representing a unified view of the total real-time capacity to the VMS program timeline, thereby depicting the overall retention timeframe of all recorded video surveillance data stored within the new container files, enabling seamless and efficient playback of any and all recorded surveillance video.

5. The system of claim 1, wherein the middleware layer is configured to group various individual surveillance cameras into a specific camera collection within the new container file and is configured to store the associated surveillance video data onto identified slower accessible second tier of storage to enable playback of a selected group of surveillance cameras in a single playback session by retrieving said new container file from a contiguous physical span on the slower accessible video surveillance storage.

6. The system of claim 1, wherein the middleware layer is configured to adjust the VMS program timeline in such a manner to restrict the privileged access of surveillance video playback from rapidly accessible storage by dereferencing the new container file that has expired from the video surveillance retention policy of the initial tier of storage.

7. The system of claim 1, wherein the system automatically adjusts the overall retention policy of the system in response to the actual physical expansion or contraction of either the rapidly accessible first tier of video storage or the slower accessible second tier of video storage as viewable from the VMS program timeline by altering the timeframe of the VMS program timeline to reflect the availability of the new container files.

8. The system of claim 1, wherein the middleware layer is configured to determine a requested video segment via the VMS program timeline, identify a physical storage location of the requested video data, and retrieve the video data from either the high-speed storage tier or second tier slower storage tier based on a mapping between video timestamps and physical storage locations.

9. The system of claim 1, wherein the middleware layer is configured for low latency data transfer between the VMS program and the storage tiers by automatically replicating requested surveillance video data, along with a configurable additional surrounding surveillance video data contained within available new container files, from slower accessible storage to rapidly accessible storage, by associating video timestamps to physical storage location mappings, to enable seamless and transparent playback of any and all surveillance video via the VMS program timeline mimicking the surveillance video data always being located on a rapidly accessible storage tier.

10. The system of claim 1, wherein the middleware layer is configured to group video surveillance camera data by individual associated surveillance cameras and enforce sequential, ordered recording of the grouped data into the new container file in sequential chronological order, written to the second archival storage tier in a predetermined sequential order across both rapidly accessible and slower accessible storage tiers, thereby avoiding non-sequential data placement on the slower accessible storage tiers and ensuring efficient and timely retrieval of video surveillance data for playback via the VMS program timeline.

11. The system of claim 1, wherein the middleware system monitors the VMS program operator repeatedly moving the VMS program timeline selector to various points in time within a short duration, and in response, the system adjusts the management of the slower accessible storage device by controlling the amount of time the retrieved new container file remains available in real time to the overall system for continual surveillance video data retrieval, to ensure timely and transparent playback of surveillance video via the VMS program timeline.

12. The system of claim 1, wherein the middleware layer is configured to utilize a lower-cost storage device that provides a solution for multi-tier video surveillance storage, enabling high-quality video recording without additional video compression by aggregating the video surveillance data into the new container file, by utilizing slower accessible storage devices, while allowing for ever-expandable total video surveillance storage capacity and seamless surveillance video playback facilitated by the sequential writing of the new container file to the slower accessible storage.

13. The system of claim 1, wherein the middleware layer is configured to prevent the VMS program from ceasing normal operation due to that VMS software timing out, by delivering temporary placeholder video data to the VMS program timeline while the middleware system retrieves the actual original recorded video data contained within the new container file from slower accessible storage, and then replacing the placeholder video data with the actual video data from the new container file, thereby allowing for the continued uninterrupted playback operation.

* * * * *